(12) United States Patent
Heisrath

(10) Patent No.: US 10,944,557 B2
(45) Date of Patent: Mar. 9, 2021

(54) SECURE ACTIVATION OF FUNCTIONALITY IN A DATA PROCESSING SYSTEM

(71) Applicant: NXP B.V., Eindhoven (NL)

(72) Inventor: Sören Heisrath, Kaltenkirchen (DE)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 15/962,495

(22) Filed: Apr. 25, 2018

(65) Prior Publication Data

US 2019/0334702 A1 Oct. 31, 2019

(51) Int. Cl.
 *H04L 9/08* (2006.01)
 *G06F 21/73* (2013.01)
 *G06F 9/445* (2018.01)

(52) U.S. Cl.
 CPC ............. *H04L 9/088* (2013.01); *G06F 21/73* (2013.01); *H04L 9/0861* (2013.01); *H04L 9/0866* (2013.01); *G06F 9/445* (2013.01)

(58) Field of Classification Search
 CPC ......... G06F 21/73; G06F 21/44; H04L 9/088; H04L 9/0861; H04L 9/0866
 See application file for complete search history.

(56) References Cited

U.S. PATENT DOCUMENTS

| | | | | |
|---|---|---|---|---|
| 5,200,999 A | * | 4/1993 | Matyas | H04L 9/088 380/277 |
| 5,708,715 A | * | 1/1998 | Vicard | G06F 21/572 713/170 |
| 5,913,217 A | * | 6/1999 | Alger | G06F 16/9014 713/502 |
| 7,131,001 B1 | | 10/2006 | Johnson | |

(Continued)

FOREIGN PATENT DOCUMENTS

| | | |
|---|---|---|
| EP | 2911086 A1 | 8/2015 |
| WO | 2017006058 A1 | 1/2017 |
| WO | 2017095920 A1 | 6/2017 |

OTHER PUBLICATIONS

X. Liang, X. Lin and X. S. Shen, "Enabling Trustworthy Service Evaluation in Service-Oriented Mobile Social Networks," in IEEE Transactions on Parallel and Distributed Systems, vol. 25, No. 2, pp. 310-320, Feb. 2014. (Year: 2014).*

C. Chang, Y. Zheng and L. Zhang, "A Retrospective and a Look Forward: Fifteen Years of Physical Unclonable Function Advancement," in IEEE Circuits and Systems Magazine, vol. 17, No. 3, pp. 32-62, thirdquarter 2017. (Year: 2017).*

(Continued)

*Primary Examiner* — Kari L Schmidt
(74) *Attorney, Agent, or Firm* — Daniel D. Hill

(57) ABSTRACT

A method is provided for securely activating or deactivating functionality in a data processing system. The method includes determining to activate or deactivate a selected functional block of a plurality of functional blocks in the data processing system. An authentication key and a unique identifier are provided to a key derivation function of a function control circuit to produce a derived key value. The key derivation function is iteratively input with a sequence of function set identifiers, where each function set identifier is for identifying one or more of the functional blocks. Each function set identifier is paired with a previously derived key value from a previous iteration. A final iteration of the key derivation function provides a verification key for verifying the authenticity of the derived key value corresponding to the selected functional block to be activated or deactivated.

19 Claims, 5 Drawing Sheets

(56) References Cited

U.S. PATENT DOCUMENTS

| | | | | |
|---|---|---|---|---|
| 7,257,715 | B2* | 8/2007 | Yamane | G06F 21/71 365/195 |
| 8,254,571 | B1* | 8/2012 | Boyen | H04L 9/0863 380/44 |
| 8,391,478 | B2* | 3/2013 | Tarkkala | H04L 9/0833 380/44 |
| 8,572,410 | B1* | 10/2013 | Tkacik | H04L 9/0861 380/44 |
| 8,775,787 | B2 | 7/2014 | Axnix et al. | |
| 8,984,602 | B1 | 3/2015 | Bailey et al. | |
| 8,990,905 | B1 | 3/2015 | Bailey et al. | |
| 9,064,094 | B1 | 6/2015 | Bailey et al. | |
| 9,100,174 | B2* | 8/2015 | Hartley | H04L 9/0866 |
| 9,100,189 | B2* | 8/2015 | Hartley | H04L 9/3247 |
| 9,379,896 | B1* | 6/2016 | Altman | H04L 9/3236 |
| 9,800,409 | B2* | 10/2017 | Nemiroff | H04L 9/0662 |
| 9,996,711 | B2* | 6/2018 | Krithivas | G06F 21/44 |
| 10,110,380 | B2* | 10/2018 | van den Berg | G06F 21/572 |
| 10,129,235 | B2* | 11/2018 | Lee | H04L 9/00 |
| 10,678,953 | B1* | 6/2020 | Allo | G06F 9/445 |
| 10,742,421 | B1* | 8/2020 | Wentz | H04L 9/3278 |
| 2002/0141575 | A1* | 10/2002 | Hird | G06F 21/62 380/44 |
| 2003/0158960 | A1* | 8/2003 | Engberg | G06Q 20/02 709/237 |
| 2006/0101270 | A1* | 5/2006 | Laitinen | H04L 63/062 713/176 |
| 2007/0121947 | A1* | 5/2007 | Sood | H04L 9/321 380/277 |
| 2007/0130472 | A1* | 6/2007 | Buer | H04L 63/083 713/182 |
| 2008/0010242 | A1* | 1/2008 | Jin | H04L 9/3236 |
| 2009/0319802 | A1* | 12/2009 | Walmsley | B41J 2/17546 713/189 |
| 2010/0122088 | A1* | 5/2010 | Oxford | G06F 21/10 713/168 |
| 2013/0046983 | A1* | 2/2013 | Zhu | H04L 9/085 713/171 |
| 2013/0189955 | A1* | 7/2013 | Horn | H04W 4/70 455/411 |
| 2014/0302820 | A1* | 10/2014 | Jones | H04L 9/0861 455/411 |
| 2015/0082048 | A1* | 3/2015 | Ferguson | G06F 21/602 713/189 |
| 2015/0089231 | A1* | 3/2015 | Oxford | H04L 9/0869 713/171 |
| 2015/0104017 | A1* | 4/2015 | Halford | H04L 9/14 380/270 |
| 2015/0318998 | A1* | 11/2015 | Erlikhman | H04L 9/08 713/171 |
| 2016/0127340 | A1* | 5/2016 | Upp | G06F 16/951 726/7 |
| 2016/0135045 | A1* | 5/2016 | Lee | H04W 12/06 726/9 |
| 2016/0261565 | A1* | 9/2016 | Lorenz | H04L 9/0866 |
| 2016/0359965 | A1* | 12/2016 | Murphy | H04L 67/22 |
| 2017/0192909 | A1* | 7/2017 | Oxford | G06F 12/0837 |
| 2017/0366527 | A1* | 12/2017 | Oxford | H04L 9/3242 |
| 2020/0059357 | A1* | 2/2020 | Fries | H04L 9/0861 |

OTHER PUBLICATIONS

Malasri, Kriangsiri, and Lan Wang. "Addressing security in medical sensor networks." Proceedings of the 1st ACM SIGMOBILE international workshop on Systems and networking support for healthcare and assisted living environments. 2007, pp. 7-12. (Year: 2007).*

Perrig, Adrian, et al.; "Efficient and Secure Source Authentication for Multicast;" In Network and Distributed System Security Symposium, NDSS 2001.

Perrig, Adrian, et al.; "Timed Efficient Stream Loss-Tolerant Authentication (TESLA): Multicast Source Authentication Transform Introduction;" Internet: http://tools.ietf.org/html/rfc4082; Technical Report, The Internet Society, Jun. 2005, No. 4082.

* cited by examiner

SECURE ACTIVATION OF FUNCTIONALITY IN A DATA PROCESSING SYSTEM

BACKGROUND

Field

This disclosure relates generally to data processing, and more particularly, to securely activating functionality in a data processing system.

Related Art

Data processing systems, such as system-on-a-chip (SoC) integrated circuit (IC) systems are produced with a variety of different configurations, functions, features, and pricing. Economically, designing and producing multiple variants of a product such as an SoC may add significantly to the cost, such that it may become economically infeasible to produce every variant. Therefore, it is often more efficient to design one product and create variants of the product by disabling or enabling a subset of the product's functionality, either during or after production. Variants of a product can be created in various ways. A variant may be made by blowing hardware fuses at the end of the production line or at the customer's site. However, this method relies on a trusted production environment or trusted customer manufacturer relationship and permanently locks out or disables a function. To prevent unauthorized variants, the use of cryptography inside the product's hardware or firmware may be necessary. Alternately, the creation of variants may be controlled using shared secrets (passwords) that also requires a trusted production environment and complex key management that requires communication between the product manufacturer and the customer. Regardless of the method used, there is a tradeoff between flexibility and security. Fuse-based approaches provide a high level of tamper resistance, but permanently disable a function. Firmware-based approaches allow for flexible post-production upscaling of the device's functionality, but introduce more complexity and cost.

Therefore, a need exists for to securely activate or deactivate functionality in a data processing system that is flexible, yet secure, with low overhead and cost.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
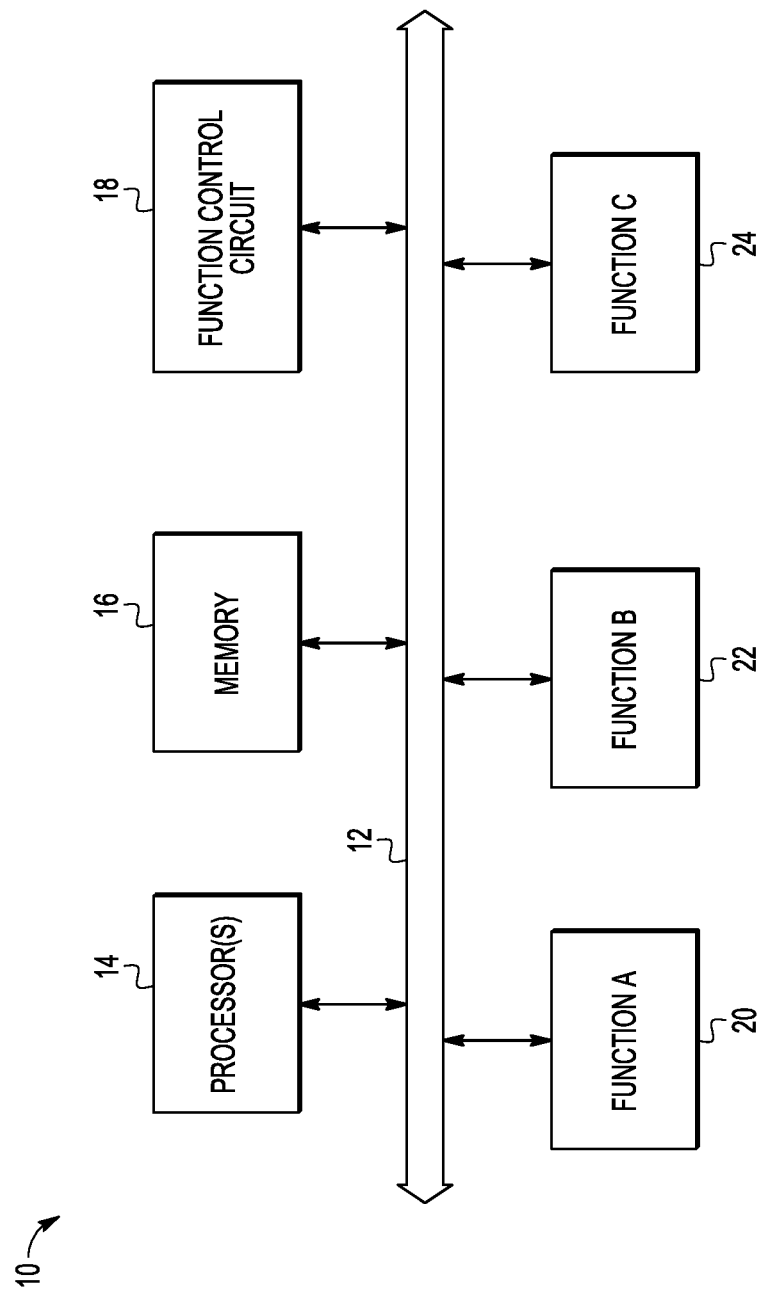
FIG. 1 illustrates a data processing system in accordance with an embodiment.

Generally, there is provided, a method for securely activating and deactivating functionality in a data processing system. Alternately, a data processing system having a secure function control circuit is provided. The method may be performed in a transaction between a seller of the data processing system and a customer. Functional blocks to be activated or deactivated are organized in sets, each set having one or more functional blocks. The sets may be further organized according to a hierarchy of importance. A function set identifier (FSID) is assigned to each set to produce a plurality of function set identifiers. There may also be multiple groups of sets. To activate or deactivate a selected set of functional blocks, the seller, or manufacturer, or user of the device loads a secret key and a unique identifier into the data processing system. The secret key and unique identifier are provided as an input to a first iteration of a key derivation function (KDF). The KDF may be, for example, a hash function or a symmetric encryption function. In response, the KDF outputs a derived key. The derived key is then concatenated with a next FSID and input into the KDF for another iteration. Each iteration produces a derived key. Multiple iterations of the KDF with subsequent derived keys paired with each FSID are performed until all of the plurality of FSIDs are used. Each of the derived keys correspond to a selected set of functional blocks and is used to authenticate the activation of the selected set of functional blocks. The output of the last iteration provides a verification key. The verification key is used for verifying the authenticity of the authentication key used to activate the selected set of functional blocks. If the verification is successful, then the activation or deactivation of the selected set of functional blocks is allowed to proceed. Verification and activation may happen during normal operation of the data processing system or during initialization (boot phase) of the system.

The method does not require a trusted production environment and provides the ability to unlock functionality of a system at a customer site. In addition, the method does not require the use of complex asymmetric cryptographic primitives or secret credentials to be stored on the device to achieve a secure activation or deactivation. Also, a database of keys is not necessary, the verification key and intermediate authentication keys are derived from initially provided credentials. This reduces effort required for key handling and production costs. Moreover, unlocking and activating functionality can be done in software, for example, via a firmware update over the air (OTA).

In accordance with an embodiment, there is provided, a method for securely activating or deactivating functionality in a data processing system, the method including: organizing a plurality of functional blocks configured to be activated or deactivated into n sets of functional blocks, where n is an integer; assigning a function set identifier to each set of functional blocks to generate n function set identifiers; determining to activate or deactivate a predetermined set of functional blocks of the n sets of functional blocks; inputting a secret key and a unique identifier of the data processing system into a key derivation function to generate a first derived key value; iteratively generating, for n iterations, additional derived key values using the key derivation function and starting with the first derived key value, wherein the first derived key value is paired with one of the n function set identifiers and input into the key derivation function to produce a next derived key value; using a derived key value corresponding to the predetermined set of functional blocks to authenticate activation or deactivation of the predetermined set of functional blocks; and generating a verification value using an n+1 iteration of the key derivation function, the verification value for verifying the authenticity of the derived key value corresponding to the predetermined set of functional blocks. A previously derived key value may be paired with a function set identifier by concatenating the previously derived key value with one of the n function set identifiers. The step of assigning a function set identifier to each set of functional blocks may further include incrementing or decrementing a counter to generate each of the n function set identifiers. After generating the verification value, the verification value may be stored in a memory location of the data processing system, the memory location isolated from other applications running on the data processing system. The key derivation function may be a one-way hash function, a symmetric decryption function, a symmetric encryption function, or a message authentication function. The step of organizing a plurality of functional blocks may further include organizing the plurality of functional blocks into m groups of functions blocks, wherein a group of functional blocks may include the n sets of functional blocks. The step of inputting the authentication key may further include a manufacturer of the data processing system inputting the authentication key. The data processing system may be implemented on an integrated circuit.

In another embodiment, there is provided, a data processing system including: a bus; a processor for executing instructions coupled to the bus; a plurality of functional blocks, coupled to the bus, the plurality of functional blocks configured to be selectively activated and deactivated, the plurality of function blocks organized into sets of one or more functional blocks, each set being identified by a function set identifier; a function control circuit, coupled to the bus, the function control circuit for activating or deactivating a selected functional block of the plurality of functional blocks, wherein the function control circuit includes a key derivation function, wherein an authentication key and a unique identifier are provided to the key derivation function to produce a derived key value, wherein in further iterations of the key derivation function, the key derivation function receives the function set identifiers in a sequence, each function set identifier paired with a previously derived key value from a previous iteration, and wherein a final iteration of the key derivation function provides a verification key for verifying the authenticity of the derived key value corresponding to the selected functional block; and storing the verification key in a memory location of the data processing system. The function control circuit may run isolated from other application contexts when the verification key is used to verify the authenticated activation or deactivation of a functional block. The memory location may be isolated with the function control circuit when the verification key is used. The functional blocks may include one or more of volatile memory, non-volatile memory, random number generator, debug interface, firmware protection mechanism, power management circuit, analog-to-digital converter (ADC), controller area network (CAN) controller, serial peripheral interface (SPI), or an ethernet function block. The data processing system may be implemented on an integrated circuit. The authentication key and the unique identifier may be concatenated together when being provided to the key derivation function. The memory location may be in a nonvolatile memory.

In yet another embodiment, there is provided, a method for securely activating or deactivating functionality in a data processing system, the method comprising: determining to activate or deactivate a selected functional block of a plurality of functional blocks in the data processing system, providing an authentication key and a unique identifier to a key derivation function of a function control circuit to produce a derived key value; and iteratively inputting to the key derivation function a sequence of function set identifiers, each function set identifier for identifying one or more of the functional blocks, each function set identifier paired with a previously derived key value from a previous iteration, a final iteration of the key derivation function providing a verification key for verifying the authenticity of the derived key value corresponding to the second functional block. The method may further include isolating the function control circuit from other application contexts when the verification key is used to verify a derived key during the authenticated activation or deactivation of the selected functional block. The key derivation function may be a one-way hash function, a symmetric decryption function, a symmetric encryption function, or a message authentication function. The method may further include generating the function set identifiers by incrementing or decrementing a counter from a predetermined value. The method may further include organizing the plurality of functional blocks into sets of functional blocks, each set including one or more functional blocks.

FIG. 1 illustrates data processing system 10 in accordance with an embodiment. The illustrated data processing system 10 is a simplified block diagram of a data processing system. Data processing system 10 includes a communication bus 12, processor(s) 14, memory 16, and function control circuit 18. Each block is bi-directionally connected to bus 12. In one embodiment, data processing system 10 may be implemented as circuitry on a single integrated circuit. Bus 12 can be any type of bus structure, for example, bus 12 may be an advanced high-performance bus (AHB) or an advanced peripheral bus (APB). Processor(s) 14 may be any type of processing circuit. For example, processor(s) 14 may be one or more microprocessors (MPUs), microcontrollers (MCUs), digital signal processors (DSPs), or another type of processor or processor core. Additionally, next to processor(s) 14 may be peripheral devices or special-purpose processors used to control peripheral units, such as for example, a direct memory access (DMA) peripheral. Memory 16 may be one or more volatile and/or non-volatile memories. Various other functional blocks are represented by functional blocks 20, 22, and 24 labeled "FUNCTION A through FUNCTION C" and may be connected to bus 12. The functional blocks may provide any kind of available additional functions. Activation and deactivation of functional blocks 20, 22, and 24 is controlled by function control circuit 18. Function control circuit 18 verifies an application-provided function set identifier (FSID) and key at boot time, or during normal operation. If access to a certain function is requested, function control circuit 18 enables or disables the requested function(s) if the authentication and verification are successful. Examples of functional blocks include, but are not limited to, memory pages of random access memory (RAM), non-volatile memory (NVM), properties of memory pages such as read-only, executable, debug interfaces, firmware protection mechanisms, peripheral units such as serial peripheral interfaces (SPI), analog-to-digital converter (ADC), controller area network (CAN), ethernet function block, and DMA, system control functionality such as power management and system clock adjustment, additional system cores and coprocessors, etc. Function control circuit 18 may be implemented in software, hardware, or a combination of hardware and software. Also, there may be multiple instances of function control circuit 18 in data processing system 10.

Figure 2:
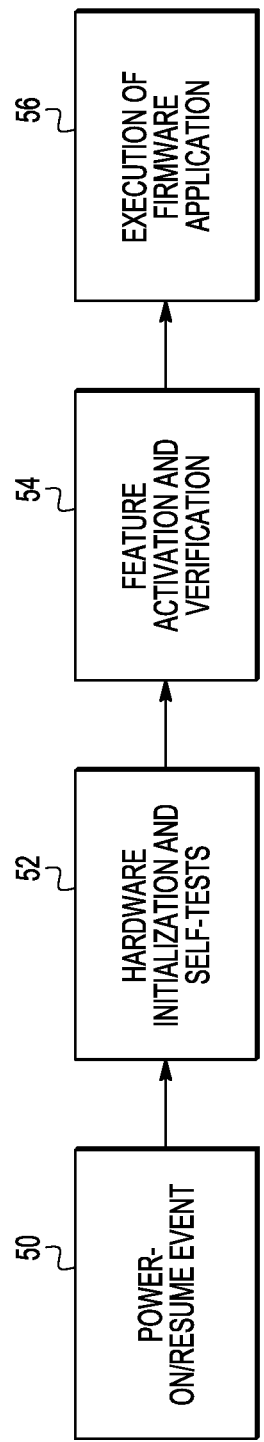
FIG. 2 illustrates a boot flow in accordance with an embodiment.

FIG. 2 illustrates a boot flow of data processing system 10 in accordance with an embodiment. At step 50, a boot of data processing system 10 starts at power-on or during a reset type of event. At step 52, hardware initialization and self-testing may be performed. At step 54, features may be activated and the activation verified. At step 56, a customer's firmware application can be executed having one or more of the features activated and verified at step 54. Step 54 is described in more detail in the discussion of FIG. 6 below.

Figure 3:
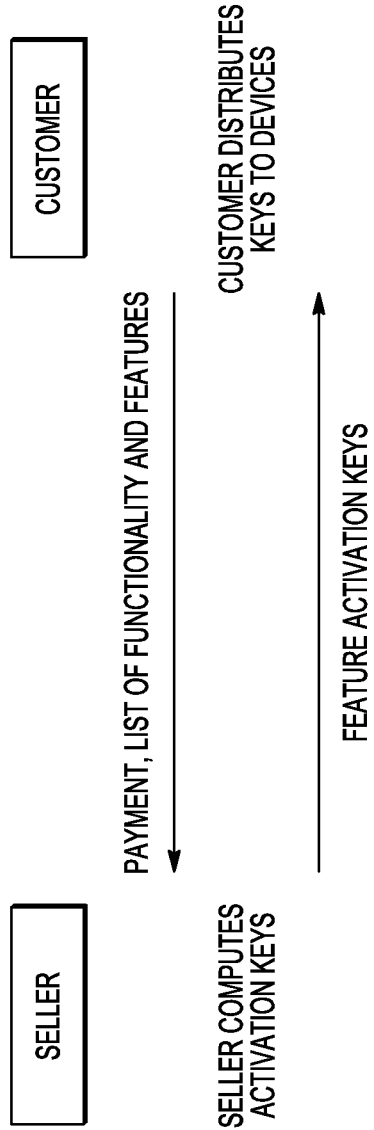
FIG. 3 illustrates the feature activation transaction in accordance with an embodiment.

FIG. 3 illustrates a feature activation transaction in accordance with an embodiment. In the event a customer (on the right) requires additional functionality in IC products purchased from the seller, or manufacturer, (on the left), the customer provides a list of features or functionality needed and a payment, if necessary. The seller then computes the activation keys. The activation keys are provided to the customer and the customer distributes the keys to devices. In this way, no customer or device database is needed, the activation keys are computed when needed. The transaction is anonymous, the seller does not need to know the customer nor user of the devices if payment has been assured. Also, performing feature/function activation in this way provides flexibility and may enable new business models, for example, the feature activation may be directly between the seller and user of the device.

Figure 4:
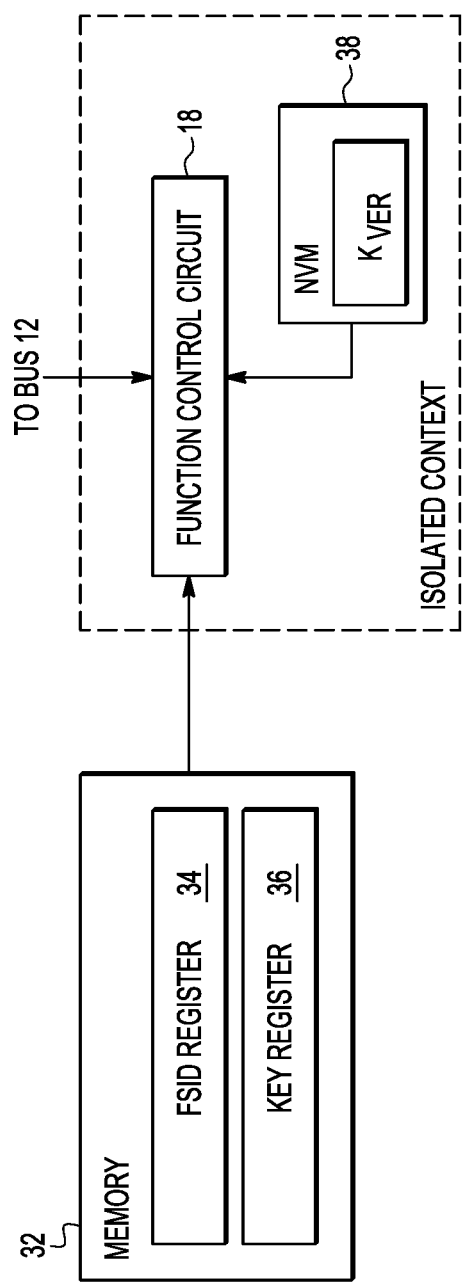
FIG. 4 illustrates a portion of the data processing system of FIG. 1 in more detail.

FIG. 4 illustrates a portion of data processing system 10 of FIG. 1 in more detail. In FIG. 4, the function control circuit 18 is connected to a non-volatile memory 38, such as a read only memory (ROM) for storing a verification key ($K_{VER}$) and other authentication data. Function control circuit 18 operates in an isolated context. At least the portion of NVM 38 for storing $K_{VER}$ is in the isolated context and is not writable by a customer, but is only writable by the manufacturer of the IC. The area of memory 38 for storing $K_{VER}$ does not have to be immutable (for example, does not have to be a ROM). The verification key $K_{VER}$ may reside in a memory region that is sufficiently protected against write access for the desired usage context. If the memory region holding verification key $K_{VER}$ is writable by function control circuit 18, the verification key $K_{VER}$ may be updated after a successful verification of a given set of authentication credentials.

Function control circuit 18 is also connected to memory 32. Memory 32 includes register 34 for storing one or more function set identifiers (FSIDs). Register 36 of memory 32 is provided for storing one or more key values. The FSIDs may be generated by creating an initial value, and using a counter to increment or decrement the initial value to generate follow-up FSIDs. In another embodiment, the FSIDs, may be generated in another way, for example, the FSIDs may be precomputed and stored in a look-up table. Memory 32 may be any type of memory, for example, NVM, flash, electronic fuses, volatile memory such as SRAM and DRAM, EEPROM. Memory 32 may be either internal or external to data processing system 10. There are no requirements regarding the storage location of the authentication credential, other than being available to function control circuit 18 during the verification step. During verification of the authentication credentials, the to-be-verified credential data is stored in a memory region protected against write access by the application. Function control circuit 18 operates independently and isolated from other application contexts in data processing system 10. Credentials for function unlocking, such as the key value, may be an authentication key provided by the seller during the transaction illustrated in FIG. 2, or by the customer in another embodiment. The verification performed by the function control circuit 18 is executed in a secure context and signals for activating or deactivating a selected functional block are provided via bus 12 through DMA controller configuration or dedicated activation/deactivation signals to function units. To guarantee a secure verification in a separate context, the verification step may, for example, happen early during device boot, or inside a hardware isolated context. Credentials in memory 32 for function unlocking may be pre-programmed by the IC manufacturer, by a device manufacturer, or by a user of a device. The device manufacturer may be a customer of the IC manufacturer.

Figure 5:
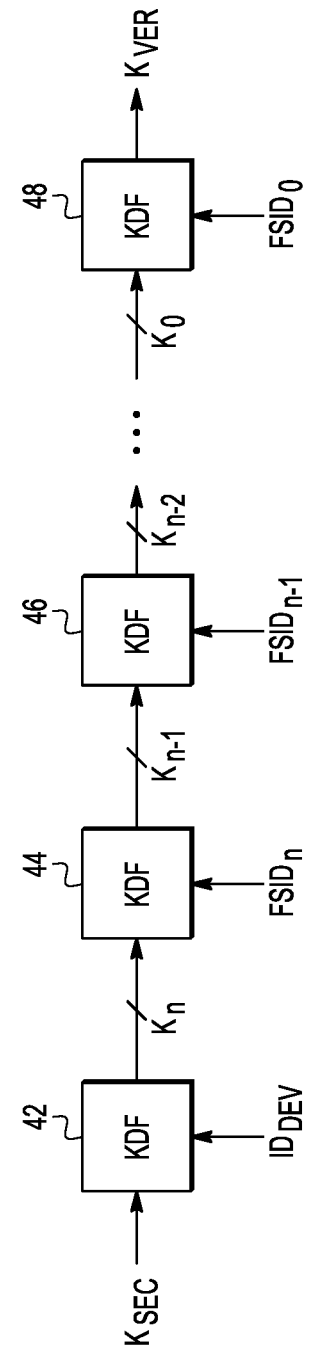
FIG. 5 illustrates key derivation of the function control circuit of FIG. 5 in accordance with an embodiment.

FIG. 5 illustrates key derivation of function control circuit 18 of FIG. 5 in accordance with an embodiment. The FSID is a value for identifying a set of function blocks that are to be activated or deactivated. In its simplest form, an FSID may be a counter or a bit vector. The FSIDs are not secret and are known to the verifier. Each FSID has a corresponding key (K) to form an authentication tuple in the form of (K, FSID). The FSIDs may be created in a linear fashion. A given FSID may be used to derive a next FSID. Derivation of follow-up FSIDs can be done using a public function such as a look-up table, bitwise decrement, bit shift, etc. A simple representation of a FSID is a bit-wise counter value. The derivation function of a follow-up FSID may be a bit-wise decrement or increment of a base FSID.

The manufacturer, or seller, provides an IC with a plurality of functional blocks that can be activated or deactivated to meet the needs of a customer. The manufacturer organizes the plurality of functional blocks into n sets of functional blocks, where n is an integer. A FSID is assigned to each set of the n sets of functional blocks. The IC manufacturer generates a secret key labeled $K_{SEC}$ in FIG. 5. The secret key $K_{SEC}$ may be an arbitrary-length bit vector comprised of randomly selected bits. The secret key $K_{SEC}$ should provide sufficient entropy, that is, it should be long enough to meet the desired security goal. For each device or subset of devices, the manufacturer may choose to create a new secret key $K_{SEC}$. Similarly, device identifier $ID_{DEV}$ is a value uniquely assigned to a single device or a plurality of devices. The device identifier may be a public value. Subsequent keys derived from the secret key $K_{SEC}$ are called derived keys. In the illustrated embodiment, there are n derived keys $K_n$ to $K_0$. Also, in the illustrated embodiment, the derived keys are enumerated in descending order where $K_n$ is the first derived key and $K_0$ is the last derived key. In another embodiment, the derived keys may be labelled in ascending order. The derivation is performed using a key derivation function (KDF). The KDF may be a one-way hash function that uses one or more given inputs to derive a result. In another embodiment, the KDF may be a symmetric decryption function, a symmetric encryption function, or a message authentication function. For example, the KDF computes the derived keys in iterations of the hash function. The secret key $K_{SEC}$ and a unique identifier $ID_{DEV}$ for the device are input to first iteration 42 of the KDF, and a first derived key $K_n$ is output. The derived key $K_n$ and corresponding $FSID_n$ are input to a next iteration 44. The derived key and corresponding FSID are thus cryptographically bound. A derived key of index i ($K_i$) is used as input to a KDF. The derived key ($K_i$) together with a corresponding $FSID_i$ is called an authentication key for $FSID_i$. A resulting derived key $K_{n-1}$ is output from iteration 44. Likewise, derived key $K_{n-1}$ and corresponding $FSID_{n-1}$ are input to next iteration 46. Iterations continue until all of the n FSIDs are input. The last iteration 48 receives derived key $K_0$ and corresponding $FSID_0$ as inputs and derives the verification key $K_{VER}$. Once a key with index i has been verified, its derived key with index i−1 may be stored in memory 38, replacing the verification key $K_{VER}$ to avoid having to perform all n iterations for every activation or deactivation. For a predetermined selected set of functional blocks to be activated, the assigned FSID and corresponding derived key are provided to function control circuit 18. The verification key is used to verify the derived key for an activation of a selected set of functional blocks. If the verification is successful, the selected functional blocks are activated. In another embodiment, the device identifier $ID_{DEV}$, used in the first iteration 42, may be replaced with a group identifier that represents a group of devices. A manufacturer may decide to assign identical group identifiers and thus identical derived keys and verification keys to a group of devices.

By way of example, a given set $(K_i, FSID_i)$ of authentication credentials correspond to a selected set of functional blocks to be activated, where i is an integer indicating an intermediate value between 0 and n. $FSID_i$ is the function set identifier for a selected function set of one or more functional blocks, and $K_i$ is the authentication key corresponding to the $FSID_i$. Function control circuit 18 loads the tuple $(K_i, FSID_i)$ from memory area 32. Function control circuit 18 then executes the KDF for i iterations as described above. After the ith iteration, the verification key, previously stored in memory 38 is used to verify the set of authentication credentials $(K_i, FSID_i)$. If the verification succeeds, function control circuit 18 enables or disables (activates or deactivates) the functional blocks described by the $FSID_i$.

A user in possession of a key with index i ($K_i$) is able to derive lower-index keys, that is, down to $K_0$ and $K_{VER}$. Key IDs may be assigned in a hierarchical manner so that the least amount of functionality is activated with $K_0$ and the highest level of functionality is activated with $K_n$. In some applications, however, there may not be a linear correlation between function subsets and product value. To overcome this limitation, function set identifiers can be assigned to groups, and at the verification step, be concatenated and processed through KDF 40.

A derived key value from one iteration of the key derivation function and the corresponding FSID, may be input to a concatenation function before a next iteration of the key derivation function is performed on the derived key value and FSID. In another embodiment, the derived key and corresponding FSID may be input to an expansion or compression function prior to processing by the KDF.

Figure 6:
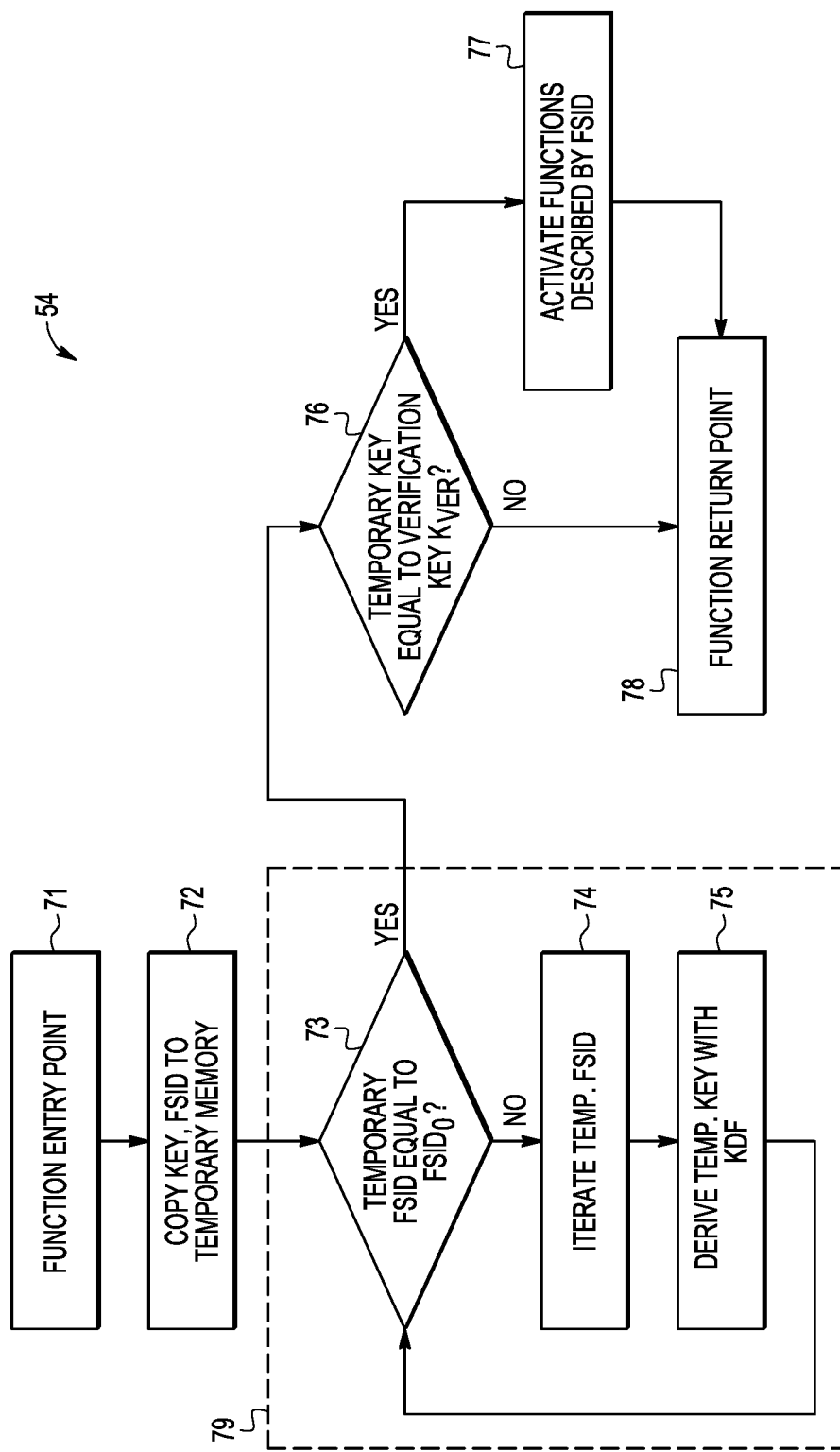
FIG. 6 illustrates the feature activation and verification step of the boot flow in FIG. 2 in more detail.

FIG. 6 illustrates the feature activation and verification step 54 of the boot flow of FIG. 2 in accordance with an embodiment. Step 71 indicates a function entry point. At step 72, the values stored at key register 36 and FSID register 34 (FIG. 5) are copied to temporary registers. The temporary registers may be at any convenient memory location in data processing system 10. Decision step 73 and steps 74 and 75 within a verification loop 79. Verification loop 79 repeatedly iterates the temporary FSID value and temporary key value to until the temporary FSID value matches the last FSID value in the hierarchy ($FSID_0$). Within verification loop 79 at decision step 73, it is determined if the value stored in the temporary FSID register and temporary key register equals $FSID_0$. If the values are not equal, at step 74, the processing continues another iteration along KDF 40 to derive another temporary key value with the KDF at step 75. After step 75, processing returns to decision step 73 another iteration of verification loop 79. Upon a successful comparison, the method proceeds to step 76. At step 76, the method verifies that the derived key in the temporary register equals the verification key 38 ($K_{VER}$). If the verification is successful, at step 77 the algorithm activates the functionality that are described by the FSID 34. Step 78 is the function return point.

Figure 7:
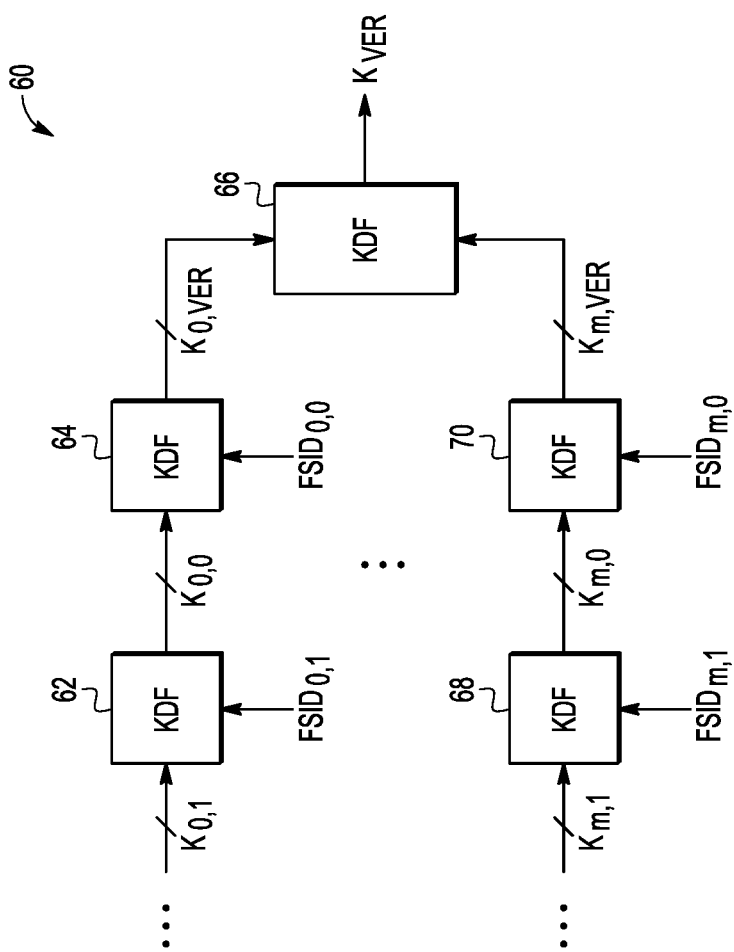
FIG. 7 illustrates key derivation in accordance with another embodiment.

FIG. 7 illustrates key derivation 60 in accordance with another embodiment. In FIG. 7, key derivation 60 includes multiple groups of sets of function set identifiers from a group 0 to a group m. Only the last iterations for each group are illustrated for the purposes of clarity and simplicity. The group 0 includes KDF iteration 62 for providing a derived key $K_{0,0}$. The derived key $K_{0,0}$ and corresponding $FSID_{0,0}$ are input to key derivation function 64 and derived group verification key $K_{0,VER}$ is output. The derived group verification key $K_{0,VER}$ is provided to an input of KDF 66. Likewise, the group m includes KDF iteration 68 receiving derived key $K_{m,1}$ and $FSID_{m,1}$ as inputs, and in response, providing derived key $K_{m,0}$. The derived key $K_{m,0}$ is provided to KDF 70 where it is input with corresponding $FSID_{m,0}$ to output $K_{m,VER}$. The derived group verification key $K_{m,VER}$ is provided to another input of KDF 66 where it is input with $K_{0,VER}$ to KDF iteration 66 to derive the verification key $K_{VER}$.

The function set identifiers with groups and subgroups may be used to activate or deactivate functionality throughout the entire lifecycle of an IC. If the verification key $K_{VER}$ is rewritten after a successful verification, the scheme may be used to iterate lifecycles of a device, lock end-of-line testing mode or to activate end-of-life debug mode.

The described method and data processing system does not require a trusted production environment and provides the ability to unlock functionality of a system at a customer site. In addition, the method and data processing system does not require the use of complex asymmetric cryptographic primitives or secret credentials to be stored on the device to achieve a secure activation or deactivation. This reduces effort required for key handling and production costs. Also, unlocking and activating functionality can be done in software, for example, via a firmware update OTA.

The illustrated embodiments may be extended to enablement of functionality in the field, device life-cycle management, enabling or disabling of the use of one or more memory pages, changing of properties of memory pages, activation and deactivation of peripheral units, system control functionality, and enabling and disabling of system cores and coprocessors.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for securely activating or deactivating functionality in a data processing system, the method comprising:
    organizing a plurality of functional blocks configured to be activated or deactivated into n sets of functional blocks, where n is an integer;
    assigning a function set identifier to each set of functional blocks to generate n function set identifiers;
    determining to activate or deactivate a predetermined set of functional blocks of the n sets of functional blocks;
    inputting a secret key and a unique identifier of the data processing system into a key derivation function to generate a first derived key value;
    iteratively generating, for n iterations, a plurality of derived key values using the key derivation function and starting with the first derived key value, wherein the first derived key value is paired with one of the n function set identifiers and input into the key derivation function to produce a next derived key value, wherein each of the plurality of derived key values corresponds to one of the n sets of functional blocks and is used to activate or deactivate the set of functional blocks to which it corresponds;
    using the derived key value of the plurality of derived key values corresponding to the predetermined set of functional blocks to authenticate activation or deactivation of the predetermined set of functional blocks;
    organizing the n function set identifiers into m groups of function set identifiers, wherein a group of the function set identifiers includes more than one set of function set identifiers, and wherein a group key value is derived for each group of the m groups of function set identifiers using a sequence of group key derivation functions, the derived group key value is output for each group of the m groups of function set identifiers and a last derived group key value is a group key verification value; and
    using the group verification key value for verifying the authenticity of the derived group key value corresponding to a selected group of sets of functional blocks.

2. The method of claim 1, wherein the first derived key value is paired with one of the n function set identifiers by concatenating the first derived key value with the one of the n function set identifiers.

3. The method of claim 1, wherein assigning a function set identifier to each set of functional blocks further comprises incrementing or decrementing a counter to generate each of the n function set identifiers.

4. The method of claim 1, wherein after generating the verification value, the verification value is stored in a memory location of the data processing system, the memory location isolated from other applications running on the data processing system.

5. The method of claim 1, wherein the key derivation function is a one-way hash function, a symmetric decryption function, a symmetric encryption function, or a message authentication function.

6. The method of claim 1, wherein the step of inputting the secret key further comprises a manufacturer of the data processing system inputting the secret key.

7. The method of claim 1, wherein the data processing system is implemented on an integrated circuit.

8. A data processing system comprising:
    a bus;
    a processor for executing instructions coupled to the bus;
    a plurality of functional blocks, coupled to the bus, the plurality of functional blocks configured to be selectively activated and deactivated, the plurality of functional blocks organized into sets of one or more functional blocks, each set being identified by a function set identifier;
    a function control circuit, coupled to the bus, the function control circuit for activating or deactivating a selected functional block of the plurality of functional blocks, wherein the function control circuit comprises a key derivation function, wherein an authentication key and a unique identifier are provided to the key derivation function to produce a derived key value, wherein in further iterations of the key derivation function, the key derivation function receives the function set identifiers in a sequence, each function set identifier paired with a previously derived key value from a previous iteration to produce a plurality of derived key values, wherein each derived key value of the plurality of derived key values corresponding to one of the sets of functional blocks, wherein the plurality of function set identifiers is organized into a plurality of groups of function set identifiers, each group of the function set identifiers corresponding to a group of sets of functional blocks, wherein a derived group key value is derived for each group of sets functional blocks using a sequence of group key derivation functions, the derived group key value is output for each group of the plurality of groups of function set identifiers, and wherein a verification key is generated from a last group key derivation function of the sequence of group key derivation functions, the group verification key for verifying the authenticity of the of a derived group key value corresponding to a selected group of functional blocks; and
    a memory for storing the verification key.

9. The data processing system of claim 8, wherein the function control circuit runs isolated from other application contexts when the verification key is used to verify the authenticated activation or deactivation of a functional block.

10. The data processing system of claim 9, wherein the memory is isolated with the function control circuit when the verification key is used.

11. The data processing system of claim 8, wherein the functional blocks includes one or more of volatile memory, non-volatile memory, random number generator, debug interface, firmware protection mechanism, power management circuit, analog-to-digital converter (ADC), controller area network (CAN) controller, serial peripheral interface (SPI), or an ethernet function block.

12. The data processing system of claim 8, wherein the data processing system is implemented on an integrated circuit.

13. The data processing system of claim 8, wherein the authentication key and the unique identifier are concatenated together when being provided to the key derivation function.

14. The data processing system of claim 8, wherein the memory is a nonvolatile memory.

15. A method for securely activating or deactivating functionality in a data processing system, the method comprising:
    organizing a plurality of functional blocks into a plurality of sets of functional blocks, wherein a set of functional blocks includes one or more functional blocks;
    determining to activate or deactivate a selected set of functional block of the plurality of sets of functional blocks in the data processing system,
    providing an authentication key and a unique identifier to a key derivation function of a function control circuit to produce a derived key value; and
    iteratively inputting to the key derivation function a sequence of function set identifiers, each function set identifier for identifying one or more of the sets of functional blocks, each function set identifier paired with a previously derived key value from a previous iteration to produce a plurality of derived key values, wherein each derived key value of the plurality of derived key values corresponding to a set of the plurality of sets of functional blocks, wherein the function set identifiers are organized in groups of sets of function set identifiers, wherein a derived group key is derived for each group of the plurality of groups of function set identifiers using a sequence of group key derivation functions, each of the derived group keys of the plurality of groups of function set identifiers is provided to one of a plurality of inputs of the group key derivation function, and a group verification key is generated using the last derived group key, and wherein the last derived group key is for verifying the authenticity of a derived group key value corresponding to a selected group of functional blocks.

16. The method of claim 15, further comprising isolating the group function control circuit from other application contexts when the verification key is used to verify a derived key during the authenticated activation or deactivation of the selected functional block.

17. The method of claim 15, wherein the key derivation function is a one-way hash function, a symmetric decryption function, a symmetric encryption function, or a message authentication function.

18. The method of claim 15 further comprising generating the function set identifiers by incrementing or decrementing a counter from a predetermined value.

19. The method of claim 15 further comprising organizing the plurality of functional blocks into sets of functional blocks, each set including one or more functional blocks.

* * * * *